(12) United States Patent
Agarwal et al.

(10) Patent No.: US 11,275,007 B1
(45) Date of Patent: Mar. 15, 2022

(54) SYSTEMS AND METHODS FOR TESTING MECHANICAL PROPERTIES OF ULTRA-SOFT MATERIALS

(71) Applicants: Arvind Agarwal, Miami, FL (US); Kazue Orikasa, Miami, FL (US); Nicole Bacca, Miami, FL (US)

(72) Inventors: Arvind Agarwal, Miami, FL (US); Kazue Orikasa, Miami, FL (US); Nicole Bacca, Miami, FL (US)

(73) Assignee: THE FLORIDA INTERNATIONAL UNIVERSITY BOARD OF TRUSTEES, Miami, FL (US)

( * ) Notice: Subject to any disclaimer, the term of this patent is extended or adjusted under 35 U.S.C. 154(b) by 6 days.

(21) Appl. No.: 17/160,596

(22) Filed: Jan. 28, 2021

(51) Int. Cl.
*G01N 3/42* (2006.01)
*G01Q 60/36* (2010.01)

(52) U.S. Cl.
CPC ....... *G01N 3/42* (2013.01); *G01N 2203/0078* (2013.01); *G01N 2203/0286* (2013.01); *G01Q 60/366* (2013.01)

(58) Field of Classification Search
CPC ... G01N 2203/0682; G01N 2203/0647; G01N 2203/008; G01N 2203/0098; G01N 2203/0082; G01N 3/42; G01Q 20/00; G01Q 30/02; G01Q 60/38
See application file for complete search history.

(56) References Cited

U.S. PATENT DOCUMENTS

| 7,966,866 B2 | 6/2011 | Hansma et al. |
| 10,663,381 B2 * | 5/2020 | Koshimizu .............. G01N 3/42 |
| 2012/0271555 A1 | 10/2012 | Levental et al. |
| 2020/0056968 A1 * | 2/2020 | Egboiyi .................. G01N 3/08 |

FOREIGN PATENT DOCUMENTS

| WO | 93/20752 | 2/1995 |
| WO | 2010/084840 | 7/2010 |

* cited by examiner

*Primary Examiner* — Brandi N Hopkins
(74) *Attorney, Agent, or Firm* — Saliwanchik, Lloyd & Eisenschenk

(57) ABSTRACT

Systems and methods for accurate characterization of the mechanical properties of ultra-soft materials in the meso/macro-length scale are provided. Through the use of a millimeter-scale, ultra-high molecular weight indenter probe, accurate mechanical characterization of ultra-soft materials on the centimeter-scale can be achieved. The indenter probe can capture the adhesion forces present during the approach and detachment segments of the indentation process.

18 Claims, 5 Drawing Sheets

SYSTEMS AND METHODS FOR TESTING MECHANICAL PROPERTIES OF ULTRA-SOFT MATERIALS

GOVERNMENT SUPPORT

This invention was made with government support under EEC-1647837 awarded by National Science Foundation. The government has certain rights in the invention.

BACKGROUND

Currently, achieving an accurate measurement of the mechanical properties of ultra-soft materials requires specialized techniques, such as nano-indentation, atomic force microscope (AFM)-based techniques, or rheology. These highly specialized techniques provide only narrow and localized nanoscale characterization of ultra-soft samples. In addition, these techniques require sophisticated equipment and/or cannot perform measurements in ultra-soft heterogeneous systems. It is difficult to understand the meso/macro scale length structural behavior of a sample with limited insight into its local nanoscale characteristics. Due to their anisotropic and heterogeneous nature, some ultra-soft materials may exhibit a wide range of mechanical characteristics throughout different locations of the sample. These challenges are related to certain analytical relationship assumptions, such as isotropy and homogeneity. The application of the assumed analytical models used in the specialized techniques discussed above may lead to a high degree of inaccurate mechanical characterization of ultra-soft samples.

BRIEF SUMMARY

Because of the drawbacks of existing techniques for measuring mechanical properties of ultra-soft materials (e.g., heterogeneous ultra-soft materials in the meso/macro-length scale), there is a need in the art for an easier, more accurate, and more accessible ultra-soft material testing platform. Ultra-soft materials cannot be mechanically characterized through existing macroscale indenters, which are conventionally made of metal and will typically pierce through the ultra-soft material sample due to indentation from high loads. As a result, such metal indenters fail to capture the adhesion forces, which are critical for ultra-soft material characterization. This piercing phenomenon leads to a grossly inaccurate estimation of the true mechanical properties of the ultra-soft sample.

Embodiments of the subject invention provide novel and advantageous systems and methods for accurate characterization of the mechanical properties of ultra-soft materials in the meso/macro-length-scale. Through the use of a millimeter-scale (e.g., 10 millimeter (mm)-diameter), ultra-high molecular weight indenter probe (e.g., a cylindrical indenter probe), accurate mechanical characterization of ultra-soft materials on the centimeter-scale can be achieved. The indenter probe accurately captures the adhesion forces present during the approach and detachment segments of the indentation process. In addition, the systems and methods can comprise observation of the indenter probe approaching the ultra-soft samples via a sensor (e.g., a light sensor such as a camera). The systems and methods of embodiments of the subject invention overcome the challenges related to surface detection that are present due to the ultra-soft nature of the compliant materials being characterized. The indenter probe can have a Young's Modulus of, for example, about 830 megaPascals (MPa) (e.g., 830 MPa+/−5%). The indenter probe can comprise or be made of, for example, a polymer such as polyethylene.

In an embodiment, a system for testing mechanical properties of an ultra-soft material can comprise: an indenter probe comprising a material with a Young's Modulus of at least 800 MPa; a sample holder disposed below the indenter probe and configured to hold the ultra-soft material; and a light sensor configured to capture light from the indenter probe. The system can further comprise an adaptor configured to be attached to a frame and/or an actuator (e.g., a mechanical load frame actuator), and the system can further comprise an indenter probe holder. The indenter probe can be a cylindrical indenter probe with a flat lower surface facing the sample holder. The light sensor can be a camera (e.g., a high speed camera). The system can further comprise a display in operable communication with (e.g., as part of) the light sensor and displaying video data therefrom. The indenter probe can have a width or a diameter in a range of, for example, from 1 mm to 20 mm. The system can further comprise at least one force transducer in operable communication with the indenter probe and configured to sense force as the indenter probe approaches and comes into physical contact with the ultra-soft material to be tested (e.g., comes into such physical contact in use of the system). The material of the indenter probe can be a polymer (e.g., ultra-high-molecular-weight polyethylene). The material of the indenter probe can have a Young's Modulus of about 830 MPa. The indenter probe can be configured to be attached to an external frame (e.g., through an adaptor). The adaptor can comprise an extruded metal cylinder with a threaded hole on the top face. The threaded hole cam allow for the adaptor to be attached to the load frame actuator using a fastener (e.g., a screw, nut, bolt, pin, and/or rivet). The adaptor can have a hollow bottom area where the probe holder is inserted and secured using one fastener (e.g., a screw, nut, bolt, pin, and/or rivet) on each side of the adaptor. The indenter probe can be disposed in an indenter probe holder (e.g. a hollow cylindrical stiff probe holder made of, for example, metal), which can secure the indenter probe to the adaptor. The indenter probe holder and/or the indenter probe can be attached to the adaptor, e.g., via a fastener (such as a screw, nut, bolt, pin, and/or rivet) or an integral formation therewith (such as being pressed and permanently secured).

In another embodiment, a method for testing mechanical properties of an ultra-soft material can comprise: providing the ultra-soft material to a sample holder of a system for testing the mechanical properties of the ultra-soft material, the system comprising: an indenter probe comprising a material with a Young's Modulus of at least 800 megaPascals (MPa); the sample holder disposed below the indenter probe and configured to hold the ultra-soft material; a camera configured to capture light from the indenter probe; and a display in operable communication with (e.g., as part of) the camera; moving at least one of the indenter probe and the sample holder such that the indenter probe and the ultra-soft material approach each other and ultimately make physical contact with each other; observing the indenter probe on the display as the indenter probe and the ultra-soft material approach each other and ultimately make physical contact with each other; moving at least one of the indenter probe and the sample holder such that the indenter probe and the ultra-soft material move away from each other after making physical contact with each other; and recording mechanical property data from the indenter probe as the indenter probe and the ultra-soft material approach each other, make physical contact with each other, and move away from each other. The system can further comprise an adaptor configured to be attached to a frame and/or an actuator (e.g., a mechanical load frame actuator), and the system can further comprise an indenter probe holder. The indenter probe can be a cylindrical indenter probe with a flat lower surface facing the sample holder. The camera can be a high speed camera. The indenter probe can have a width or a diameter in a range of, for example, from 1 mm to 20 mm. The system can further comprise at least one force transducer in operable communication with the indenter probe and configured to sense force as the indenter probe approaches and comes into physical contact with the ultra-soft material to be tested (e.g., comes into such physical contact in use of the system), and the recording of the mechanical property data can comprise using the at least one force transducer to record the mechanical property data. The material of the indenter probe can be a polymer (e.g., ultra-high-molecular-weight polyethylene). The material of the indenter probe can have a Young's Modulus of about 830 MPa. The indenter probe can be configured to be attached to an external frame (e.g., through an adaptor). The adaptor can comprise an extruded metal cylinder with a threaded hole on the top face. The threaded hole can allow for the adaptor to be attached to the load frame actuator using a fastener (e.g., a screw, nut, bolt, pin, and/or rivet). The adaptor can have a hollow bottom area where the probe holder is inserted and secured using one fastener (e.g., a screw, nut, bolt, pin, and/or rivet) on each side of the adaptor. The indenter probe can be disposed in an indenter probe holder (e.g. a hollow cylindrical stiff probe holder made of, for example, metal), which can secure the indenter probe to the adaptor. The indenter probe holder and/or the indenter probe can be attached to the frame or adaptor, e.g., via a fastener (such as a screw, nut, bolt, pin, and/or rivet) or an integral formation therewith (such as being pressed and permanently secured).

DETAILED DESCRIPTION

Figure 1:
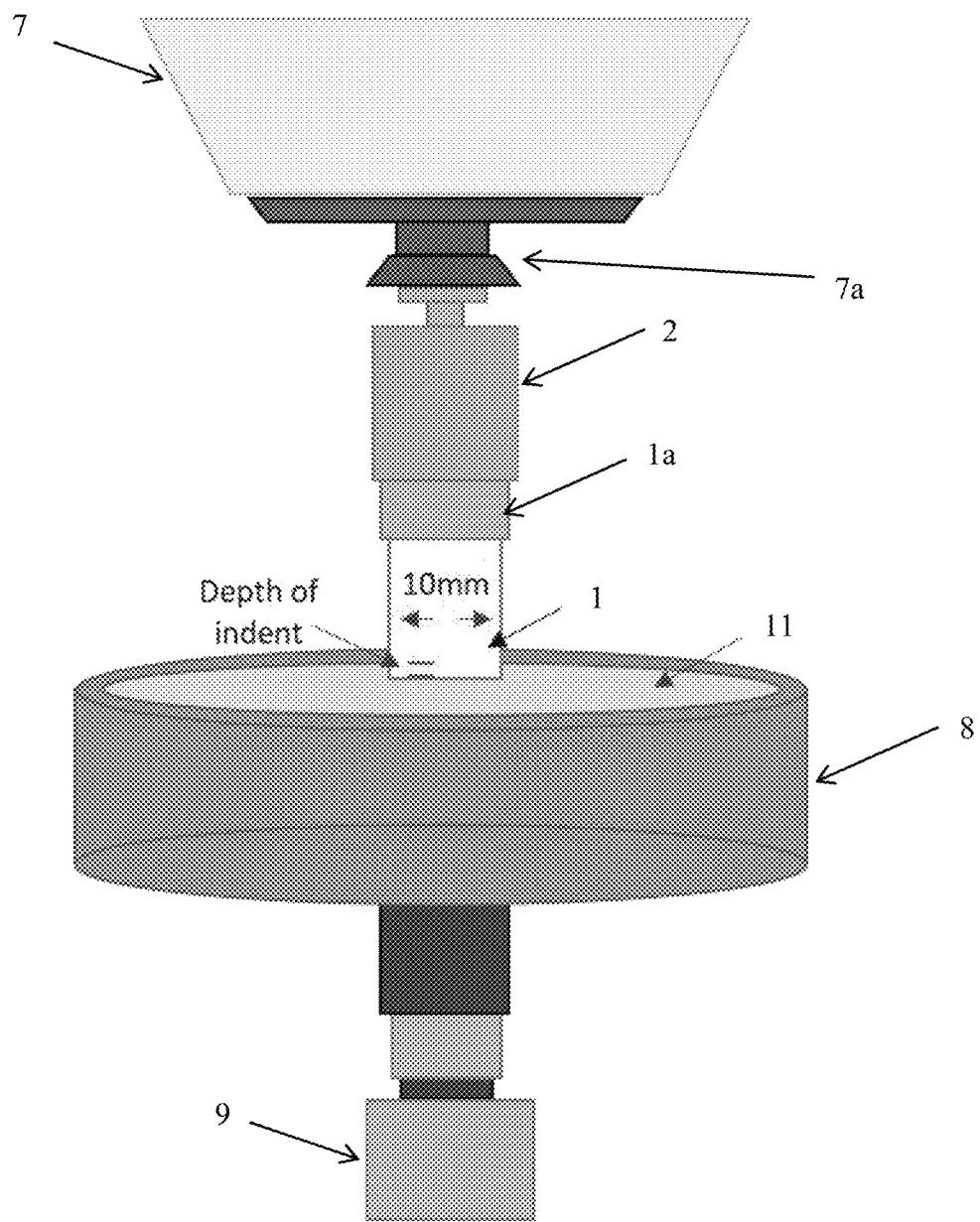
FIG. 1 is a schematic view of a system for testing mechanical properties of ultra-soft materials in the meso/macro-length scale, according to an embodiment of the subject invention.

Embodiments of the subject invention provide novel and advantageous systems and methods for accurate characterization of the mechanical properties of ultra-soft materials in the meso/macro-length scale. Through the use of a millimeter-scale (e.g., 10 millimeter (mm)-diameter), ultra-high molecular weight indenter probe (e.g., a cylindrical indenter probe), accurate mechanical characterization of ultra-soft materials on the centimeter-scale can be achieved. The indenter probe accurately captures the adhesion forces present during the approach and detachment segments of the indentation process. In addition, the systems and methods can comprise observation of the indenter probe approaching the ultra-soft samples via a sensor (e.g., a light sensor such as a camera). The systems and methods of embodiments of the subject invention overcome the challenges related to surface detection that are present due to the ultra-soft nature of the compliant materials being characterized. The indenter probe can have a Young's Modulus of, for example, about 830 megaPascals (MPa) (e.g., 830 MPa+/−5%). The indenter probe can comprise or be made of, for example, a polymer such as ultra-high-molecular-weight polyethylene.

When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

Systems and methods of embodiments of the subject invention provide centimeter-scale ultra-soft material mechanical property testing that enables the accurate measurement of the mechanical properties of ultra-soft materials (e.g., biological tissues, hydrogels, elastomers, gels, and other similar low-stiffness materials) in the meso/macroscopic scale through the indentation technique. An ultra-high molecular weight indenter probe (e.g., a polyethylene probe) can be used to capture the small forces ultra-soft materials undergo throughout the indentation process. The indenter probe can have a width or diameter of, for example, any of the following values, about any of the following values, at least any of the following values, at most any of the following values, or any range having any of the following values as endpoints (all values are in mm): 0.5, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 55, 60, 65, 70, 75, 80, 85, 90, 95, or 100. For example, the indenter probe can have a width or diameter of 10 mm or about 10 mm.

Related art systems mechanical characterization using indentation in the macroscale can only be used with much stiffer and harder materials (and not with soft or ultra-soft materials). This is due at least in part to the challenges related to surface detection that are present due to the ultra-soft nature of the compliant materials being characterized. In related art systems for stiff materials, the surface detection issues during the indentation process have been addressed using the "set-point" method. The set-point method involves approaching the indenter probe to the sample surface until a small force is detected. This technique can work with stiff materials, but with compliant materials, it leads to an overestimation of stiffness, elastic modulus, and hardness values. Thus, embodiments of the subject invention can employ a different technique for addressing challenges related to surface detection. The indenter probe can be observed approaching the sample by using a sensor (e.g., a light sensor such as a camera (e.g., a high-speed camera that captures, for example, visible light)), and this enables detection of probe-to-sample contact visually. This visual representation allows for higher control of the approaching section of the indentation process.

Systems of embodiments of the subject invention can include a framework or frame, or can be attached to an existing testing load frame (e.g., a low load mechanical testing load frame). Systems and methods of embodiments of the subject invention were tested on a variety of materials with different mechanical properties was tested (see, e.g., FIG. 4) and provided the same level of accuracy as the current gold standards used for ultra-soft material characterization through indentation, such as BioSoft® Bruker. The ultra-high molecular weight polymer indenter probe captured the adhesion forces present during the indentation process of ultra-soft materials, resulting in an accurate measurement of the sample's stiffness and Young's Modulus.

The design selection of a high molecular weight polymer (e.g., Young's Modulus of 830 MPa or about 830 MPa) as the material to machine the indenter probe involved considering fundamental aspects of ultra-soft materials. For example, the stiffness compatibility between the indenter probe and ultra-soft materials plays a crucial role. If the probe's stiffness is too high, the indenter would run through the sample and would not be able to capture the adhesion forces, which are characteristic of ultra-soft materials. On the other hand, if the probe's stiffness is too low, the probe would not indent into the sample, and subsequent sample characterization would not be possible. An ultra-high molecular weight material (e.g., an ultra-high molecular weight polymer, such as ultra-high molecular weight polyethylene) can be used to machine the indenter probe to ensure that the probe's compliance is negligible and to ensure the probe can accurately capture the adhesion forces during the indentation process.

The geometrical shape of the indenter probe can be, for example, a cylindrical punch configuration. Various technical aspects can be considered in order to select the shape. For example, the characteristic heterogeneity and complex nature of ultra-soft materials can be taken into consideration. A sharp indenter probe would not be suitable to mechanically characterize ultra-soft samples because, due to a relatively small tip-to-sample contact area, significant disparities may be encountered within the samples. Instead, a single measurement performed with a dull tip can be considered as the average of many measurements performed with a sharp probe. Another fundamental point considered for selecting probe geometry is the data analysis aspect of the tests. The indenter probe shape plays a crucial role in indentation data analysis. The contact area between the probe and the sample is measured to characterize the samples. A cylindrical punch geometrical shape can significantly simplify the data analysis because a cylindrical indenter shape has a constant contact area during the indentation process, so there is no need to measure the tip-to-sample contact area for each test. Thus, a flat cylindrical punch geometrical shape can be used for the indenter probe.

The indenter probe can be compatible with existing or conventional tabletop mechanical frames (e.g., low load tabletop mechanical frames), increasing its accessibility. The probe width or diameter can be selected based on the mechanical frame to which it will be attached. The probe width or diameter can also be selected based on the size of the sample, leading to a wide range of sample sizes that can be characterized with the testbed.

Embodiments of the subject invention can cover an extensive range of forces and displacements. The testbed is capable of characterizing ultra-soft materials in the few Newton (N) load range (e.g., a load of 1 N or more) and the millimeter displacement range (e.g., a displacement of 1 mm or more). This wide range enables a relatively larger deformation volume that captures bulk material behavior for ultra-soft samples. Typical nano- and micro-indentation techniques cover limited nanoNewton (nN) to milliNewton (mN) load range, and from nanometer (nm) to sub-mm displacement range. This limited range restricts their capability of mechanical characterization to significantly lower deformation volume. An ultra-soft material can be defined as a material with a Young's Modulus of less than 100 kilopascals (kPa).

In many embodiments, the indenter can be attached to an existing mechanical property testing instrument and thus does not require a completely new mechanical frame. The fact that the system or method can be adopted by employing a single fixture decreases the cost of measuring ultra-soft material mechanical properties by orders of magnitude. Further, the testing systems and methods do not require specialized training to employ. Mechanical characterization of ultra-soft materials in the macroscale is used extensively in medical, automotive, and industrial applications. All of these fields can save time and money by adopting systems and methods for ultra-soft material testing of embodiments of the subject invention, as they accurately characterize the mechanical properties of ultra-soft materials in the meso/macro-length scale.

Embodiments of the subject invention provide a depth-sensing indentation testbed capable of performing mechanical measurements in the in the meso/macro-length scale and the Newton load scale. This testbed captures material properties from a larger sample volume overcoming limitations, such as high contact stresses and size effects, commonly present in nano- and micro-indentation approaches.

Figure 2:
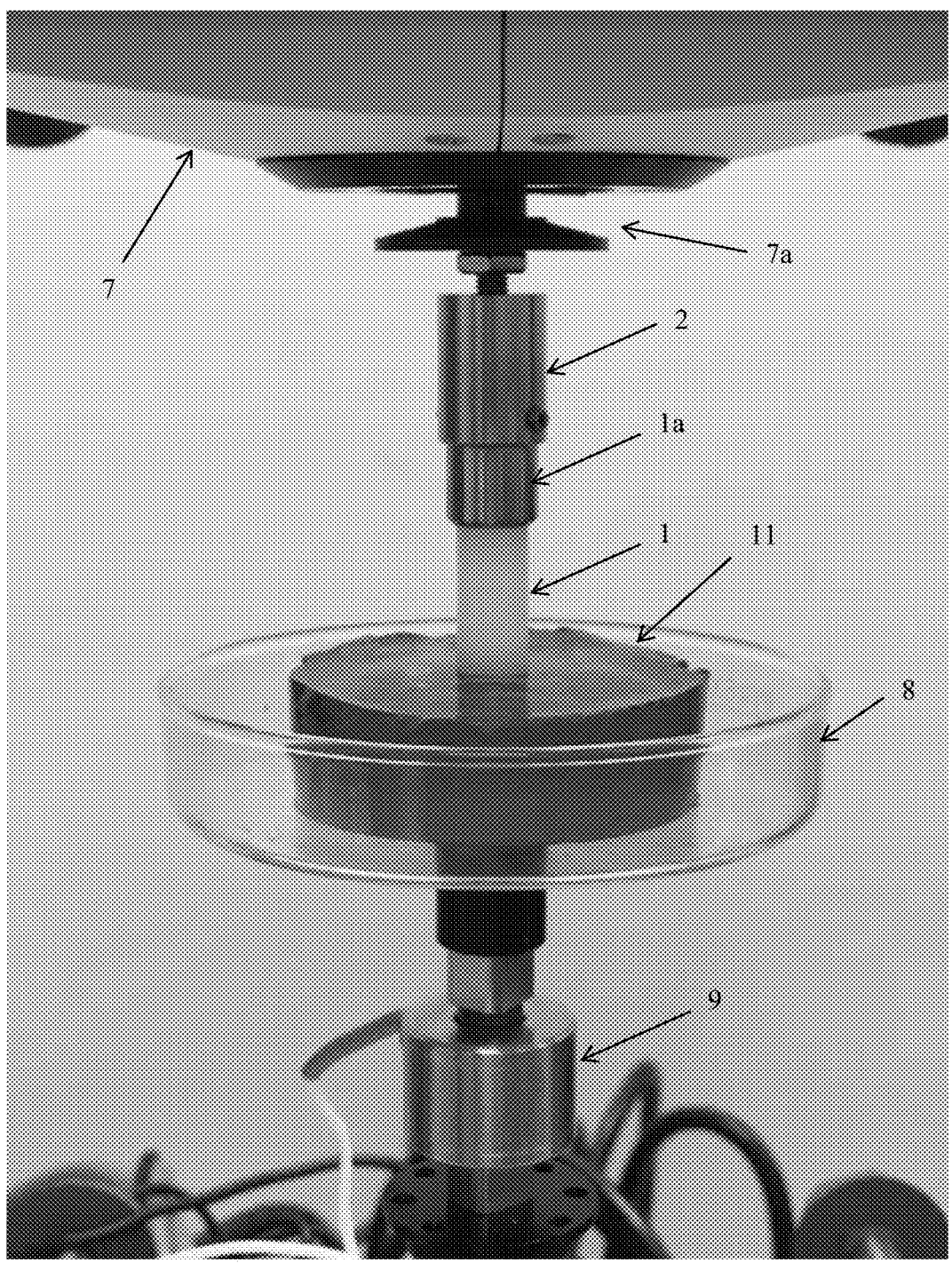
FIG. 2 is an image of a system for testing mechanical properties of ultra-soft materials in the meso/macro-length scale, according to an embodiment of the subject invention.
Figure 5:
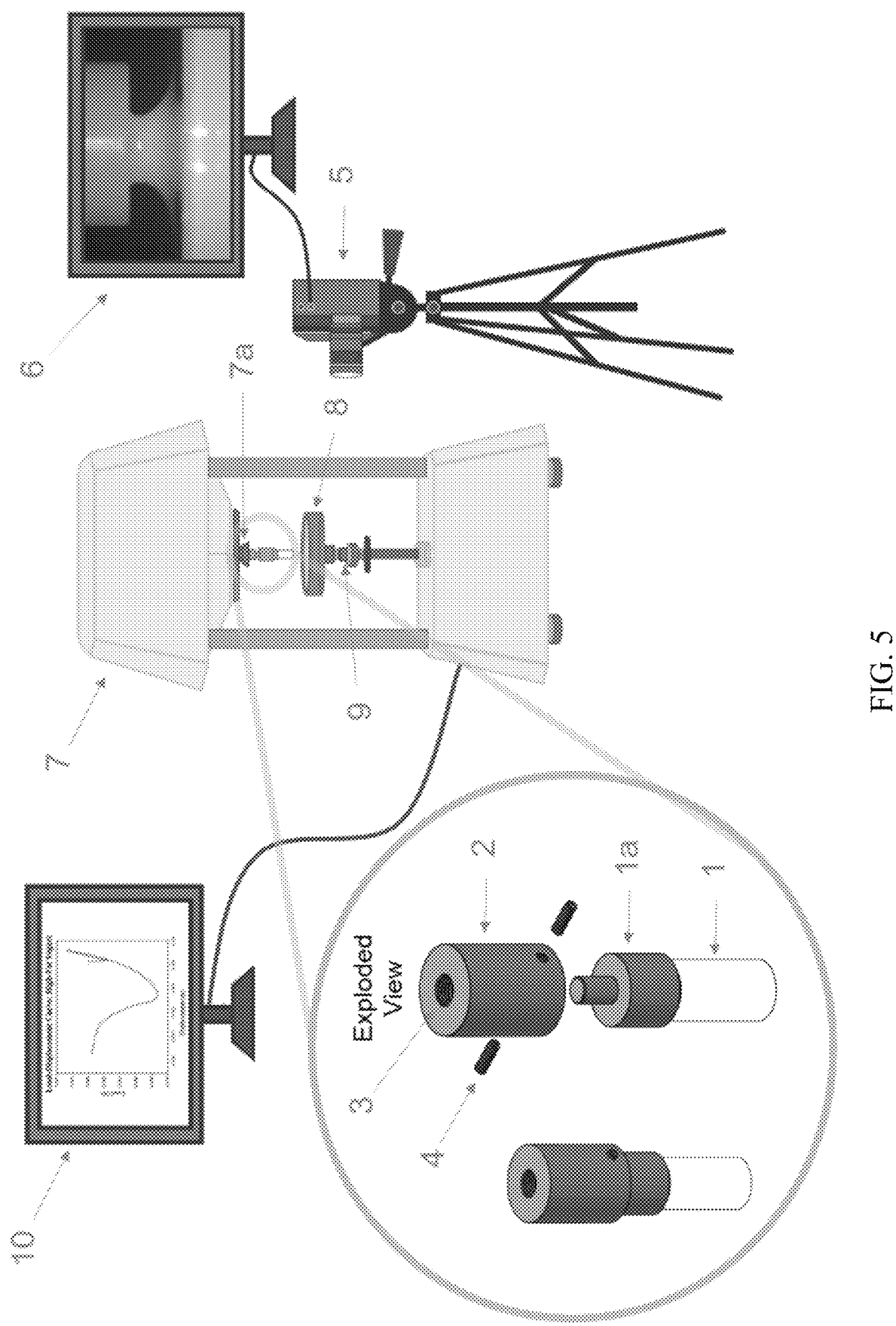
FIG. 5 is a schematic view of a system for testing mechanical properties of ultra-soft materials in the meso/macro-length scale, according to an embodiment of the subject invention.

Each of FIGS. 1 and 5 is a schematic view of a system for testing mechanical properties of ultra-soft materials in the meso/macro-length scale, according to an embodiment of the subject invention, and FIG. 2 is an image of a system for testing mechanical properties of ultra-soft materials in the meso/macro-length scale, according to an embodiment of the subject invention. Referring to FIGS. 1, 2, and 5, the system can include an indenter probe, which can comprise or be made of an ultra-high molecular weight material (e.g., a material with a Young's Module of at least 800 MPa, such as about 830 MPa). As seen in FIGS. 1 and 5, the system can further comprise an adaptor 2 configured to be attached to a frame 7 and/or an actuator 7a (e.g., a mechanical load frame actuator 7a), and the system can further comprise an indenter probe holder 1a. The indenter probe 1 can be attached to a frame or a framework 7 (e.g., through an adaptor 2). The adaptor 2 can comprise an extruded metal cylinder with a threaded hole on the top face. This threaded hole can allow for the adaptor to be attached to the load frame actuator using a fastener 3 (e.g., a screw, nut, bolt, pin, and/or rivet). The adaptor can have a hollow bottom area where the probe holder 1a is inserted and secured using one fastener 4 (e.g., a screw, nut, bolt, pin, and/or rivet) on each side of the adaptor 2. The indenter probe can be disposed above a sample holder 8 (e.g., a sample tray, sample well, or sample dish) that can hold the sample of material (e.g., ultra-soft material) to be tested. The system can be configured such that the indenter probe can be slowly brought into contact with the sample 11 in the sample holder 8; this can be accomplished by the frame or framework 7 to which the indenter probe Lis attached lowering the indenter probe 1 towards the sample 11 and/or the sample holder 8 rising up to the indenter probe. The indenter probe can be disposed in an indenter probe holder (e.g. a hollow cylindrical stiff probe holder made of, for example, metal), which can secure the indenter probe to the frame or the framework. The indenter probe holder and/or the indenter probe can be attached to the frame or framework, e.g., via a fastener (such as a screw, nut, bolt, pin, and/or rivet) or an integral or monolithic formation therewith. The sample holder 8 can also be attached to the adaptor, the frame, or the framework (or to a second (separate from, or attached to, the main frame or framework), e.g., via a fastener (such as a screw, nut, bolt, pin, and/or rivet) or an integral formation therewith. Although FIG. 1 lists a width/diameter of the probe as 10 mm, this is for exemplary purposes only and should not be construed as limiting; similarly, although FIGS. 1 and 5 indicate the probe can be a polymer probe, this is for exemplary purposes only and should not be construed as limiting.

The system can further include at least one sensor 5 in proximity to the indenter probe 1; the at least one sensor can be, for example, a light sensor such as a camera (e.g., a high speed camera). The at least one sensor 5 can be attached to the frame or framework (or to another (separate from, or attached to, the main frame or framework and/or the second frame or framework), e.g., via a fastener (such as a screw, nut, bolt, pin, and/or rivet); the at least one sensor 5 can alternatively be detached from all frames or frameworks to which the adaptor 2, the indenter probe holder 1a, the indenter probe 1, and/or the sample holder 8 is/are attached. The at least one sensor 5 can capture images and/or video of the indenter probe 1 coming into contact with the sample 11 during testing and can send such images and/or video to a display 6, either on the at least one sensor 5 or in operable communication therewith. A user can view in real time the images and/or video of the indenter probe 1 coming into contact with the sample 11 and can control the indenter probe 1 accordingly, adjusting the speed and/or direction (e.g., up or down) of the indenter probe 1 based on what is viewed in real time. That is, the indenter probe 1 can be observed approaching the sample 11 and this enables detection of probe-to-sample contact visually; this visual representation allows for higher control of the approaching stage of the indentation process.

The system can also include at least one force or pressure sensor 9 (e.g., at least one transducer) disposed on and/or in operable communication with the indenter probe 1. The at least one force or pressure sensor 9 can sense the force or pressure during the indentation process and can display 10 results of the same. In combination with the visual observation from the at least one light sensor 5, mechanical properties of the sample 11 (e.g., adhesion forces, Young's Modulus, etc.) can be determined using the system/method. A correlation between the data obtained from the at least one force or pressure sensor 9, and the at least one sensor 5 (e.g., a light sensor such as a camera (e.g., a high-speed camera that captures, for example, visible light)) can be established.

Figure 3:
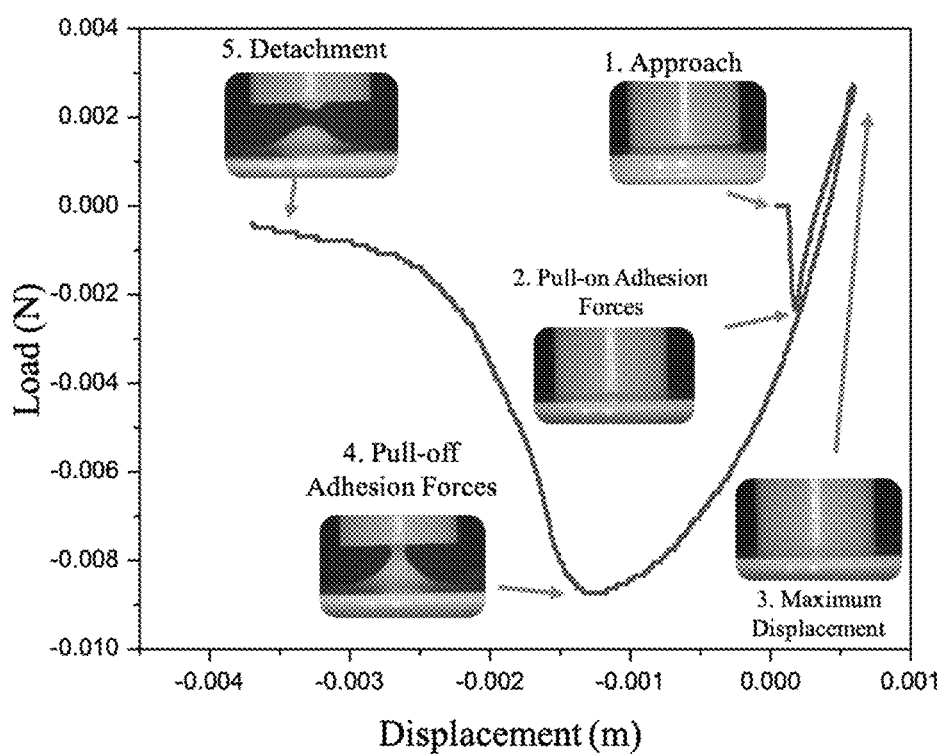
FIG. 3 is a plot of displacement (in meters (m)) versus load (in Newtons (N)) showing the load-displacement curve for ultra-soft materials, as tested by an indentation system for testing mechanical properties of ultra-soft materials in the meso/macro-length scale, according to an embodiment of the subject invention. The insets show five portions of the curve corresponding to approach of the system/apparatus probe (1), pull-on adhesion forces (2), maximum displacement (3), pull-off adhesion forces (4), and detachment (5), respectively. Each of the events corresponding to these portions of the curve is shown by an image captured during testing; the images were captured by a sensor of the system/apparatus (e.g., a camera, such as a high-speed camera).

FIG. 3 is a plot of displacement (in meters (m)) versus load (in Newtons (N)) showing the load-displacement curve for ultra-soft materials, as tested by a system for testing mechanical properties of ultra-soft materials in the meso/macro-length scale, according to an embodiment of the subject invention. The insets show five portions of the curve corresponding to approach of the apparatus/system tip (1), pull-on adhesion forces (2), maximum displacement (3), pull-off adhesion forces (4), and detachment (5), respectively. Each of the events corresponding to these portions of the curve is shown by an image captured during testing; the images were captured by a sensor of the apparatus (e.g., a camera, such as a high-speed camera).

Figure 4:
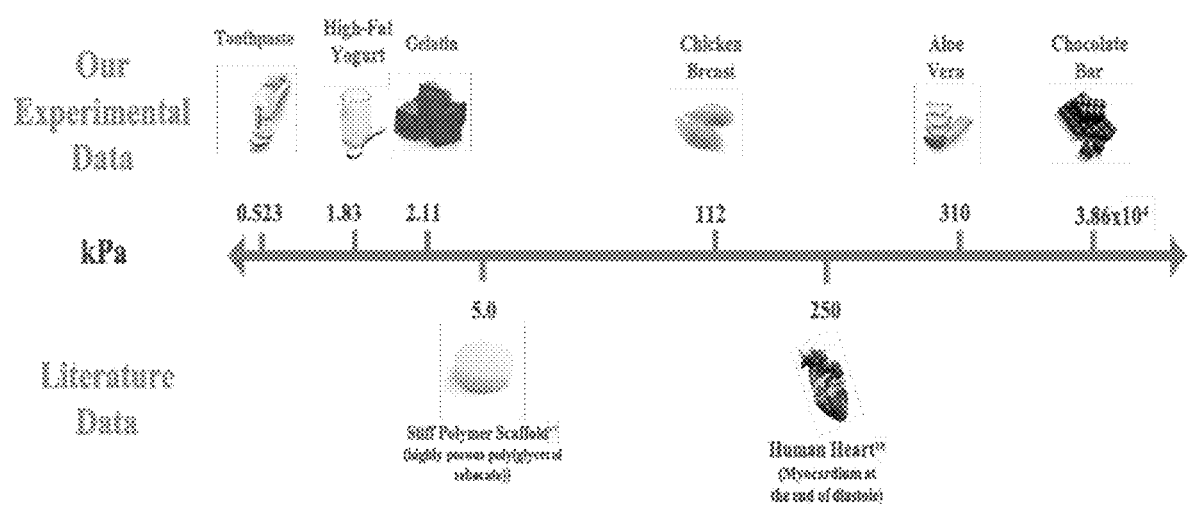
FIG. 4 is representation showing the Young's Modulus scale of soft and ultra-soft materials, as tested using a system according to embodiment of the subject invention (labeled as "our experimental data") and obtained from other sources (labeled as "literature data"). The line showing the Young's Modulus has values in kilopascals (kPa), and the values for toothpaste, high-fat yogurt, gelatin, a stiff polymer scaffold, chicken breast, a human heart, aloe vera, and a chocolate bar are shown.

FIG. 4 is representation showing the Young's Modulus scale of soft and ultra-soft materials, as tested using a system according to embodiment of the subject invention (labeled as "our experimental data") and obtained from other sources (labeled as "literature data"). The line showing the Young's Modulus has values in kPa, and the values for toothpaste, high-fat yogurt, gelatin, a stiff polymer scaffold, chicken breast, a human heart, aloe vera, and a chocolate bar are shown.

Systems and methods of embodiments of the subject invention have several advantages over the related art, including being able to straightforwardly test mechanical properties of ultra-soft materials in the meso/macro-length scale with a relatively large deformation volume while also capturing ultra-soft material characteristic adhesion forces. Systems and methods can also: utilize an elastomeric indenter; test mechanical properties of soft materials (e.g., Young's Modulus of at least 100 kPa but less than 1 MPa); utilize a cylindrical indenter; perform macro-indentation testing; utilize lower range load cells; and/or use a lower indentation rate. Systems and methods of embodiments of the subject invention provide the only testing system/method that can capture adhesion forces, use macroscale indentation, and accurately mechanically characterize ultra-soft materials.

Embodiments of the subject invention have a wide range of applications. Any industry that deals with, or is interested in, the properties of ultra-soft materials will benefit from embodiments of the subject invention, including but not limited to implant materials and technologies, soft robotics, tissue engineering technologies, organ-on-chip technologies, flexible surgical equipment, flexible electronics, sensors and actuators, structural and packaging materials, foams and adhesives, detergents, cosmetics, paints, food additives, lubricants, and fuel additives. All of these industries/fields utilize ultra-soft materials, so the mechanical property analysis of ultra-soft materials is beneficial. Understanding and controlling the mechanical properties of these materials can enable advancements in all of any of these fields as well.

Another field that can benefit from embodiments of the subject invention is the polymer science and technology industries. An extremely wide range of ultra-soft materials is under the purview of the polymer science industry, ranging from hydrogels in the medical industry to thermal gap fillers in the thermal management industry. The polymer technology industry is constantly seeking to develop and improve the quality of the polymeric materials, and the mechanical properties of polymers play an essential role for their applications. Thus, embodiments of the subject invention that allow for accurate testing of mechanical properties of ultra-soft materials would be of interest to this industry.

Another field that can benefit from embodiments of the subject invention is the regenerative medicine field. Replacing human tissue with artificial tissues requires a deep understanding of the mechanical properties of these engineered tissues. Embodiments of the subject invention can enable accessible characterization of employed biomaterials, which are ultra-soft by nature, and this can in turn allow advanced material development for regenerative purposes.

Yet another field that can benefit from embodiments of the subject invention is the biomedical industry. As bioengineering has evolved, the characterization of mechanical properties for ultra-soft materials, such as tissues, has simultaneously gained importance. The developments of artificial replacements of human tissue require studying the mechanical properties of a variety of biomaterials such as implants or scaffolds at various stages of their development. The testbed can also benefit various additional industries, including but not limited to food production, as it is of interest to improve the properties of food products to improve quality and customer satisfaction. Further, the automotive and aerospace industries are continually studying the properties of ultra-soft materials, such as fuel and lubricants and would therefore also benefit from embodiments of the subject invention.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A system for testing mechanical properties of an ultra-soft material in the meso/macro-length scale, the system comprising:
    an indenter probe comprising a material with a Young's Modulus of about 830 megaPascals (MPa), the indenter probe comprising a flat lower surface and a side surface perpendicular to the flat lower surface;
    a sample holder disposed below and facing, in a vertical direction, the flat lower surface of the indenter probe, the sample holder being configured to hold the ultra-soft material; and
    a light sensor disposed to a side, in a horizontal direction perpendicular to the vertical direction, of the sample holder,
    the light sensor being configured to capture an image of the side surface of the indenter probe making physical contact with the ultra-soft material in use.

2. The system according to claim 1, further comprising:
    an indenter probe holder configured to hold the indenter probe; and
    an adaptor configured to be attached to the indenter probe holder and to a mechanical load frame actuator.

3. The system according to claim 1, the indenter probe being a cylindrical indenter probe with the flat lower surface facing the sample holder.

4. The system according to claim 1, the light sensor being a high speed camera.

5. The system according to claim 1, further comprising a display in operable communication with the light sensor and displaying video data therefrom.

6. The system according to claim 1, the indenter probe having a width or a diameter in a range of from 1 millimeter (mm) to 20 mm.

7. The system according to claim 1, further comprising at least one force transducer disposed below, in the vertical direction the sample holder,
    the at least one force transducer being in operable communication with the indenter probe and configured to sense force as the indenter probe approaches and comes into physical contact with the ultra-soft material in use.

8. The system according to claim 1, the material of the indenter probe being a polymer.

9. The system according to claim 1, the material of the indenter probe being polyethylene.

10. The system according to claim 1, the indenter probe being configured to be attached to an external frame.

11. A method for testing mechanical properties of an ultra-soft material in the meso/macro-length scale, the method comprising:
    providing the ultra-soft material to a sample holder of a system for testing the mechanical properties of the ultra-soft material, the system comprising:
        an indenter probe comprising a material with a Young's Modulus of about 830 megaPascals (MPa), the indenter probe comprising a flat lower surface and a side surface perpendicular to the flat lower surface;
        the sample holder disposed below and facing, in a vertical direction, the flat lower surface of the indenter probe, the sample holder being configured to hold the ultra-soft material;
        a camera disposed to a side, in a horizontal direction perpendicular to the vertical direction, of the sample holder, the camera being configured to capture an image of the side surface of from the indenter probe making physical contact with the ultra-soft material in use; and
        a display in operable communication with the camera;
    moving at least one of the indenter probe and the sample holder such that the indenter probe and the ultra-soft material approach each other and ultimately make physical contact with each other;
    observing the indenter probe on the display as the indenter probe and the ultra-soft material approach each other and ultimately make physical contact with each other;
    moving at least one of the indenter probe and the sample holder such that the indenter probe and the ultra-soft material move away from each other after making physical contact with each other; and
    recording mechanical property data from the indenter probe as the indenter probe and the ultra-soft material approach each other, make physical contact with each other, and move away from each other.

12. The method according to claim 11, the system further comprising:
    an indenter probe holder configured to hold the indenter probe; and
    an adaptor configured to be attached to the indenter probe holder and to a mechanical load frame actuator.

13. The method according to claim 11, the indenter probe being a cylindrical indenter probe with the flat lower surface facing the sample holder.

14. The method according to claim 11, the camera being a high speed camera.

15. The method according to claim 11, the indenter probe having a width or a diameter in a range of from 1 millimeter (mm) to 20 mm.

16. The method according to claim 11, further comprising at least one force transducer disposed below, in the vertical direction the sample holder,
    the at least one force transducer being in operable communication with the indenter probe, and
    the recording of the mechanical property data comprising using the at least one force transducer to record the mechanical property data.

17. The method according to claim 11, the material of the indenter probe being a polyethylene.

18. A system for testing mechanical properties of an ultra-soft material, the system comprising:
- an indenter probe comprising a material with a Young's Modulus of about 830 megaPascals (MPa), the indenter probe being a cylindrical indenter probe with a flat lower surface and a side surface perpendicular to the flat lower surface;
- a sample holder disposed below and facing, in a vertical direction, the flat lower surface the indenter probe, the sample holder being configured to hold the ultra-soft material;
- an indenter probe holder configured to hold the indenter probe;
- an adaptor configured to be attached to the indenter probe holder and to a mechanical load frame actuator; and
- a high speed camera disposed to a side, in a horizontal direction perpendicular to the vertical direction, of the sample holder, the high speed camera being configured to capture an image of the side surface of the indenter probe making physical contact with the ultra-soft material in use;
- a display in operable communication with the high speed camera and displaying video data therefrom; and
- at least one force transducer disposed below, in the vertical direction the sample holder, the at least one force transducer being, in operable communication with the indenter probe and configured to sense force as the indenter probe approaches and comes into physical contact with the ultra-soft material in use, the indenter probe having a diameter in a range of from 1 millimeter (mm) to 20 mm, the material of the indenter probe being polyethylene, and the indenter probe being configured to be attached to an external frame.

* * * * *